United States Patent [19]

Dowling

[11] Patent Number: 4,832,556
[45] Date of Patent: May 23, 1989

[54] COUPLING APPARATUS

[76] Inventor: Arthur J. Dowling, P.O. Box 188, Oberlin, Kans. 67748

[21] Appl. No.: 762,277

[22] Filed: Aug. 5, 1985

Related U.S. Application Data

[63] Continuation-in-part of Ser. No. 433,854, Oct. 12, 1982, abandoned, which is a continuation of Ser. No. 194,390, Oct. 6, 1980, abandoned.

[51] Int. Cl.$^4$ .............................................. F16B 23/00
[52] U.S. Cl. ................................... 411/406; 411/403; 403/350
[58] Field of Search .................. 403/350, DIG. 7; 411/403, 402, 398, 406, 407; 81/436, 177.85

[56] References Cited

U.S. PATENT DOCUMENTS

| Re. 22,681 | 10/1945 | Bugg | 411/403 |
|---|---|---|---|
| 2,338,023 | 12/1943 | Bugg | 411/403 |
| 3,966,340 | 6/1976 | Morris | 403/353 |
| 4,128,038 | 12/1978 | Urwin | 411/403 |

FOREIGN PATENT DOCUMENTS

| 2332543 | 1/1974 | Fed. Rep. of Germany | 403/DIG. 8 |
|---|---|---|---|
| 2456618 | 7/1975 | Fed. Rep. of Germany | 403/350 |
| 132378 | 7/1951 | Sweden | 248/188 |
| 2037390 | 7/1980 | United Kingdom | 411/402 |

*Primary Examiner*—Andrew V. Kundrat
*Attorney, Agent, or Firm*—Robert S. Smith

[57] ABSTRACT

A coupling which consists of first and second solid members. In one form a first coupling element has a recess therein and has a first boss disposed in the recess. The first boss and the recess each have a geometric axis. The axes of the recess and the first boss are disposed in generally parallel relationship. The first boss is disposed in eccentric relationship to the recess, the recess having a peripheral surface which is axially tapered. The coupling includes a second coupling element having a second boss having a peripheral surface dimensioned and configured for engagement with the recess. The second boss is an annulus and has a hole therein for receiving the first boss. The hole and the second boss each have a geometric axis, the axes of the hole and the second boss being generally aligned. The second boss has an exterior surface which is axially tapered and dimensioned for engagement with the recess. In one form of the invention one of the members is a furniture body and the other is a furniture leg. In another form of the invention one of the members is a screwdriver and the other is a screw.

10 Claims, 2 Drawing Sheets

COUPLING APPARATUS

RELATED APPLICATIONS

This is a continuation in part of application Ser. No. 433,854, filed Oct. 12, 1982 now abandoned, which is a continuation of application Ser. No. 194,390, filed Oct. 6, 1980, which has been abandoned.

BACKGROUND OF THE INVENTION

The invention pertains to couplings, joining techniques and cooperating surfaces for transmitting a rotary force. The invention has particular application to cooperating screws and screwdrivers and also to fastening furniture lags to the body of a piece of furniture.

The cooperating screw and screwdriver application of the invention is of greatest importance in those applications where there is no room to hold a screw with one hand while turning the screwdriver with the other hand. The prior art includes magnetic screwdriver blades and/or leaf springs which engage the screw head. Such apparatus has not been wholly satisfactory either because the screw is precariously gripped by the screwdriver and vulnerable to being lost. For example, if there is any axial misalignment between the screw and the cooperating threaded surface, the danger of losing or at least dropping the screw is very significant. The magnetic field produced by the magnetized screwdriver blades is objectionable for many applications such as where a delicate mechanism is being worked on that cannot be magnetized or for devices that include integrated circuits that would be adversely affected. In some other applications stainless steel or non-ferrous threaded fasteners are required and this prevents utilization of magnetized screwdriver blades.

In the quality furniture field it is imperative that the legs and other appendages be secured in a rigid manner. The prior art includes the use of a variety of glues and other fastening means. Presently available means for joining furniture legs have not, in general, been able to provide the degree of rigidity which is possible with the apparatus in accordance with the invention.

It is an object of the invention to provide a coupling apparatus construction that will make a very rigid connection between two cooperating members.

It is another object of the invention to provide a cooperating screw and screwdriver construction which will not be vulnerable to even slight side loads which might cause the screw to be separated from the screwdriver blade.

Still another object of the invention is to provide apparatus which may be used with a wide variety of construction materials including wood, plastics, metal and other materials.

Another general object of the invention is to provide apparatus which is not only sturdy, but which is also relatively invulnerable to inadvertent separations, such as by tipping of the cooperating elements.

SUMMARY OF THE INVENTION

The foregoing objects and other objects and advantages which shall become apparent from the detailed description of the preferred embodiment are attained in a coupling, in one form of the invention, which consists of first and second solid members. A first coupling element has a recess therein and has a first boss disposed in the recess. The first boss and the recess each have a geometric axis. The axes of the recess and the first boss are disposed in generally parallel relationship. The first boss is disposed in eccentric relationship to the recess, the recess having a peripheral surface which is axially tapered. The coupling includes a second coupling element having a second boss having a peripheral surface dimensioned and configured for engagement with the recess. The second boss is an annulus and has a hole therein for receiving the first boss. The hole and the second boss each have a geometric axis, the axes of the hole and the second boss being generally aligned. The second boss has an exterior surface which is axially tapered and dimensioned for engagement with the recess. In one form of the invention one of the members is a furniture body and the other is a furniture leg. In another form of the invention one of the members is a screwdriver and the other is a screw.

In other embodiments of the invention the apparatus may include a coupling which consists of first and second solid members or first and second associated members. A first coupling element has a recess therein. The first coupling element has a hole disposed in the recess, the hole and the recess each have a geometric axis. The axes of the recess and the hole are disposed in generally parallel relationship, the hole is disposed in eccentric relationship to the recess. The recess has a peripheral surface which is axially tapered. A second coupling element has a first boss having a peripheral surface dimensioned and configured for engagement with the recess. The first boss has a second boss extending from a face of the first boss. The second boss is dimensioned for engagement with the hole. The second boss and the first boss each have a geometric axis, the axes of the second boss and the first boss are generally aligned. The first boss has an exterior surface which is axially tapered and dimensioned for engagement with the recess. In one form of the invention one of the members is a furniture body and the other a furniture leg. In another form of the invention one of the members is a screwdriver and the other a screw.

BRIEF DESCRIPTION OF THE ACCOMPANYING DRAWING

The invention will be better understood by reference to the accompanying drawing, in which.

DESCRIPTION OF THE PREFERRED EMBODIMENT

Figure 1:
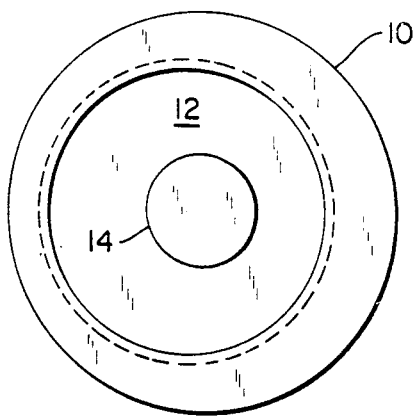
FIG. 1 is a plan view of a first coupling element.
Figure 2:
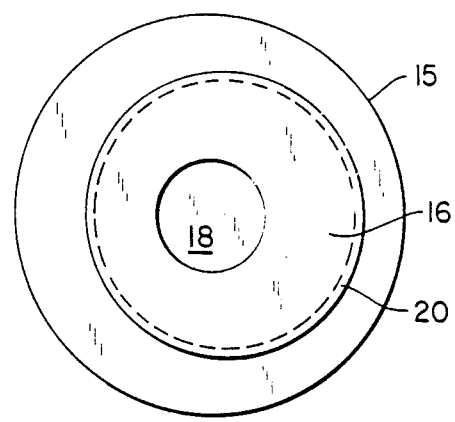
FIG. 2 is a plan view of the second coupling element intended to cooperate with the apparatus illustrated in FIG. 1.

Referring now to FIGS. 1-6, there is shown a coupling apparatus in accordance with the invention which includes a first body member with it's integral first coupling element 10 having a recess 12 therein. Disposed in the recess 12, ordinarily, will be a generally circular and eccentrically disposed first boss 14. The contour of the sides of the first boss 14 ordinarily will be that of a cylinder. Walls 13 of the recess 12 will ordinarily have the contour of a truncated cone. More specifically, the recess 12 will be tapered so that successive axial cross-sections have increasing diameters when taken at successively lower (as viewed in FIG. 1) elevations. It will be seen that the recess 12 and the first boss 14 each have a geometric axis (not shown) and that they are offset from each other a finite amount.

A second 15 includes an annular second body member with it's integral second coupling element boss 16 having an outer peripheral side or surface 20 intended for engagement with the recess 12. The second boss 16 is provided with a hole and, more specifically, a blind hole 18 also having a contour of a cylinder. It will be seen that the second boss 16, as well as the hole 18, each have a geometric axis (not shown) and that the hole 18 is offset by the same finite amount as is the offset between the first boss 14 and the recess 12. The axial taper on the side of the recess 12, and the side 20 of the second boss 16 ordinarily will be the same.

In operation, the first boss 14 engages the hole 18 and the cooperation therebetween acts as a pilot. The exterior surface or side 20 of the second boss 16 engages the recess 12. Relatively angular rotation of the body member 10 relative to the second boss 16 produces a camming action, because of the eccentricity of the various parts, which tends to lock the apparatus in a fixed position. In some applications it may be desirable to provide a transverse pin extending through the recess 12, the second boss 16 and also the first boss 14.

It will be further seen that any attempt to rock the members 10 and 15 in an attempt to separate the two coupling members 10, 15 will result in the surface or side 20 of the second boss 16 more firmly engaging the wall 13 of the recess 12 and, thus, make removal even more difficult. Ordinarily, the maximum diameter of the second boss 16 will be only slightly less than the minimum diameter of the recess 12.

In some embodiments of the invention the walls 13 and 20 may have cross-sections which are non-circular. For example, the cross-section may be oval or of some other geometric form to increase the locking action. Such forms will tend to lock more firmly. The degree of locking will also vary with the clearance between the parts. The application for the apparatus will govern the degree of locking desired.

Figure 3:
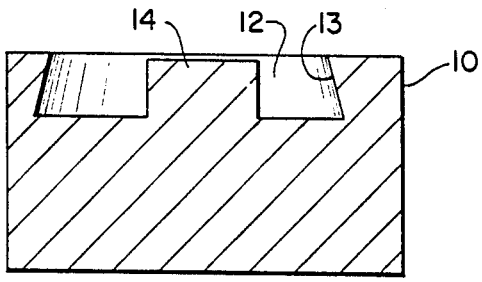
FIG. 3 is a sectional view, taken along a vertical plane, of the coupling element illustrated in FIG. 1.
Figure 4:
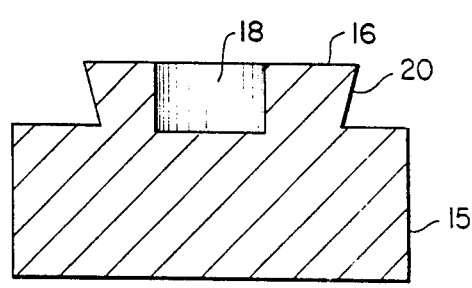
FIG. 4 is a sectional view taken, along a vertical plane, of the coupling element illustrated in FIG. 2.
Figure 5:
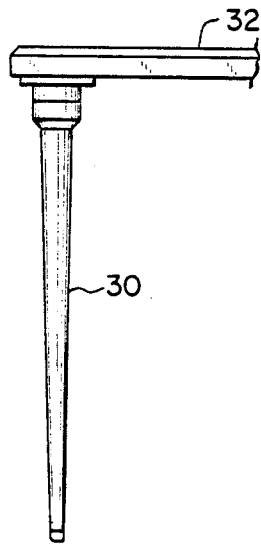
FIG. 5 is a broken away, elevational view of a table and the connection of one leg to the body thereof.
Figure 6:
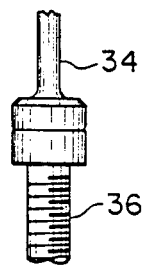
FIG. 6 is a broken away, elevational view of a screw and screwdriver utilizing the coupling apparatus in accordance with the invention.
Figure 7:
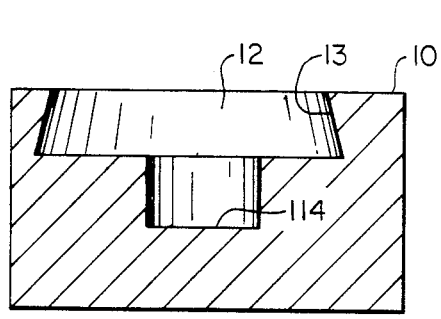
FIGS. 7 and 8 are respectively cross-sectional views taken through a vertical plane of another embodiment of the invention, which is substantially similar to the embodiment illustrated in FIGS. 3 and 4 except for the reversal of the relative positions of the meshing hole and boss.
Figure 8:
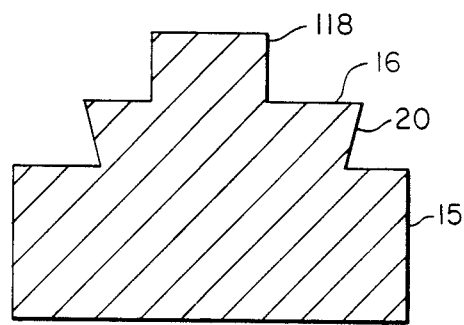

Another form of the invention is shown is shown in FIGS. 7 and 8, which are cross-sectional views similar to FIGS. 3 and 4. In the embodiment of FIGS. 7 and 8, however, the relative positions of the first boss 14 and the hole 18 have been reversed. More specifically, the boss shown in FIG. 8 and which is identified by the reference numeral 118 extends from the second boss 16. The hole in this embodiment is identified by the reference numeral 114 and is disposed within the recess 12. In all other respects the embodiment of FIGS. 7 and 8 is the same as the embodiment illustrated in FIGS. 1-4. In most embodiments of the embodiment of the invention shown in FIGS. 1-4 the geometry has specific characteristics which are illustrated. The first body member with it's integral first coupling element 10 includes the boss 14 and the recess 12 which each have a geometric axis and the axes of the recess 12 and the boss 14 are disposed in generally parallel relationship, the boss 14 is disposed in eccentric relationship to the recess 13, and the recess 13 has a wall or peripheral surface 13 which is axially tapered. The second body member with its integral coupling element 15 has a second boss 16 having a peripheral surface 20 dimensioned and configured for engagement with the recess 12, the second boss 16 is an annulus and has a hole 18 therein for receiving the first boss 14. The hole 18 and the second boss 16 each have a geometric axis, the axes of the hole 18 and the second boss 16 are generally aligned. The second boss 16 has an exterior surface or outer peripheral surface 20 which is axially tapered and dimensioned for engagement with the recess 12. One of the members with integral coupling element 10 or 15 is a screwdriver and the other is a screw and the first boss 14 and the hole 18 have the geometric axes thereof disposed in coincident relation when the associated members with integral coupling elements are assembled, the first body member with integral coupling element 10 and the second body member with integral coupling element 15 are each elongated and each has a geometric axis, the geometric axis of the first and second coupling elements 10 and 15 are coincident with each other and coincident with the axes of the first boss 14 and the hole 18 when the members are assembled.

In the embodiment of FIG. 7 and 8 the illustrated embodiment includes first and second associated body members that have respective cooperating coupling elements 10 and 15 and means for engaging the first and second body members 10 and 15 to prevent relative rotational and axial movement therebetween. The means comprises (1) a first coupling element integral with the first body member 10 having a recess 12 therein, the first coupling element 10 has a hole 114 disposed in the recess 12, the hole 114 and the recess 12 each have a geometric axis, the axes of the recess 12 and the hole 114 are disposed in generally parallel relationship, the hole 114 is disposed in eccentric relationship to the recess 12, and the recess 12 has a peripheral surface which is axially tapered and (2) a second coupling element integral with the second member 15 having a first or larger boss 16 which has a peripheral surface dimensioned and configured for engagement with the recess 12, the larger boss has a second smaller boss extending from a face of the larger boss, the smaller boss is dimensioned for engagement with the hole 114, the larger or first boss and the smaller or second boss each having a geometric axis, the axes of the second boss and the first boss are generally aligned, the first boss has an exterior surface which is axially tapered and dimensioned for engagement with the recess 12. One of the members 10, 15 is a screwdriver 34 and the other is a screw 36. The second boss 118 and the hole 114 have the geometric axes thereof disposed in coincident relation when the associated members 10 and 15 are assembled. The body members with the respective integral first coupling element and the second coupling element 10 and 15 are each elongated and each have a geometric axis, the geometric axis of the body members with integral first and second coupling elements 10 and 15 are coincident with each other and coincident with the axes of the second boss 118 and the hole 114 when the members are assembled.

Either body member with respective coupling elements 10 or 15 may be a screw 36 or screwdriver 34.

In various alternative structures the dimensions and proportions of the apparatus may be changed to make the apparatus either easier or harder to separate once it has been joined. The coupling may be manufactured of metal, plastic, wood or other material. The apparatus so joined may be separated when such intentional separation is intended. One of the coupling elements may, for example, have a sleeve manufactured as an integral part thereof for engagement with a leg 30 of a piece of furniture 32. In other embodiments, the coupling elements or members 10, 15 may be provided with flanges (not shown) for engagement with the bottom surface of a table top or a leg. A screwdriver having a blade 34 may engage a screw or threaded fastener 36. The truncated conical surfaces may be turned on a lathe. The coupling, in accordance with the invention may be advantageously used in furniture assemblies which are preferably shipped at least partly disassembled and which, with the coupling described herein, may be joined at the ultimate customer's location. The joining is simple and easy for a layman to practice.

The invention has been described with reference to its illustrated embodiments. Persons skilled in the art may, upon exposure to the teachings herein, conceive variations in the mechanical development of the components therein. Such variations are deemed to be encompassed by the disclosure, the invention being delimited only by the appended claims.

Having thus described my invention, I claim:

1. A coupling which comprises:

first and second associated members;
   means for engaging said first and second members to prevent relative rotational and axial movement therebetween, said means comprising (1) a first coupling element having a recess therein, said first coupling element having a first boss disposed in said recess, said first boss and said recess each having a geometric axis, said axes of said recess and said first boss being disposed in generally parallel relationship, said first boss being disposed in eccentric relationship to said recess said recess, having a peripheral surface which is axially tapered and (2) a second coupling element having a second boss having a peripheral surface dimensioned and configured for engagement with said recess, said second boss being an annulus and having a hole therein for receiving said first boss, said hole and said second boss each having a geometric axis, said axes of said hole and said second boss being generally aligned, said second boss having an exterior surface which is axially tapered and dimensioned for engagement with said recess;
   one of said members being a screwdriver and the other being a screw; and
   said first boss and said hole having the geometric axes thereof disposed in coincident relation when said associated members are assembled, said first coupling element and said second coupling element each being elongated and each having a geometric axis, the geometric axis of said first and second coupling elements being coincident with each other and coincident with the axes of said first boss and said hole when said members are assembled.

2. A coupling which comprises:

first and second associated members;
   means for engaging said first and second members to prevent relative rotational and axial movement therebetween, said means comprising (1) a first coupling element having a recess therein, said first coupling element having a hole disposed in said recess, said hole and said recess each having a geometric axis, said axes of said recess and said hole being disposed in generally parallel relationship, said hole being disposed in eccentric relationship to said recess, said recess having a peripheral surface which is axially tapered and (2) a second coupling element having a first boss having a peripheral surface dimensioned and configured for engagement with said recess, said first boss having a second boss extending from a face of said first boss, said second boss being dimensioned for engagement with said hole, said second boss and said first boss each having a geometric axis, said axes of said second boss and said first boss being generally aligned, said first boss having an exterior surface which is axially tapered and dimensioned for engagement with said recess; and
   one of said members being a screwdriver and the other being a screw.
   said second boss and said hole having the geometric axes thereof disposed in coincident relation when said associated members are assembled, said first coupling element and said second coupling element each being elongated and each having a geometric axis, the geometric axis of said first and second coupling elements being coincident with each other and coincident with the axes of said second boss and said hole when said elongated members are assembled.

3. A screw which comprises:

an elongated member having a geometric axis and having a recess at one axial extremity, said elongated member having a first boss disposed in said recess, said first boss and said recess each having a geometric axis, said axes of said recess and said first boss being disposed in generally parallel relationship, said boss being disposed in eccentric relationship to said recess, said recess having a peripheral surface which is axially tapered, said boss being disposed with the geometric axis thereof in coincident relation with the geometric axis of said screw.

4. A screwdriver which comprises;

an elongated member having a geometric axis and having a recess at one axial extremity, said elongated member having a first boss disposed in said recess, said first boss and said recess each having a geometric axis, said axes of said recess and said first boss being disposed in generally parallel relationship, said boss being disposed in eccentric relationship to said recess, said recess having a peripheral surface which is axially tapered, said boss being disposed with the geometric axis thereof in coincident relation with the geometric axis of said screwdriver.

5. A screw which comprises:

an elongated member having a geometric axis, said elongated member having a first boss having a peripheral surface dimensioned and configured for engagement with a recess of an associated member, said boss being an annulus and having a hole therein for receiving an associated boss of an associated member, said hole and said boss each having a geometric axis, said axes of said hole and said boss being generally aligned and said hole having a geometric axis thereof disposed in coincident relation to the geometric axes of said screw.

6. A screwdriver which comprises:

an elongated member having a geometric axis, said elongated member having a boss having a peripheral surface dimensioned and configured for engagement with a recess of an associated member, said boss being an annulus and having a hole therein for receiving a boss of an associated member, said hole and said boss each having a geometric axis, said axes of said hole and said boss being generally aligned and said hole having a geometric axis thereof disposed in coincident relation to the geometric axes of said screwdriver.

7. A screw which comprises:

an elongated member having a geometic axis and having a first recess at one axial extremity, said elongated member having a second recess disposed in said recess, said first recess and said second recess each having a geometric axis, said axes of said first recess and said second recess being disposed in generally parallel relationship, said first recess being disposed in eccentric relationship to said second recess, said first recess having a peripheral surface which is axially tapered, said scond recess being disposed with the geometric axis thereof in coincident relation with the geometric axis of said screw.

8. A screwdriver which comprises:

an elongated member having a geometric axis and having a first recess at one axial extremity, said elongated member having a second recess disposed in said recess, said first recess and said second recess each having a geometric axis, said axes of said first recess and said second recess being disposed in generally parallel relationship, said first recess being disposed in eccentric relationship to said second recess, said first recess having a peripheral surface which is axially tapered, said second recess being disposed with the geometric axis thereof in coincident relation with the geometric axis of said screwdriver.

9. A screw which comprises:

an elongated member having a geometric axis, said elongated member having a first boss having a peripheral surface dimensioned and configured for engagement with a recess of an associated member, said boss having a second boss mounted on the face thereof, said first and second bosses each having a geometric axis, said axes of said first and second bosses being generally aligned and said second boss having a geometric axis disposed in coincident relation with the geometric axis of said screw.

10. A screwdriver which comprises:

an elongated member having a geometric axis, said elongated member having a first boss having a peripheral surface dimensioned and configured for engagement with a recess of an associated member, said boss having a second boss mounted on the face thereof, said first and second bosses each having a geometric axis, said axes of said first and second bosses being generally aligned and said second boss having a geometric axis disposed in coincident relation with the geometric axes of said screwdriver.

* * * * *